March 16, 1948.　　　E. H. VARMEE　　　2,437,794
METALWORKING MACHINE
Filed Sept. 29, 1943　　　3 Sheets-Sheet 1

Inventor
Ernest H. Varmee
By Richmond A. Hayes
Attorney

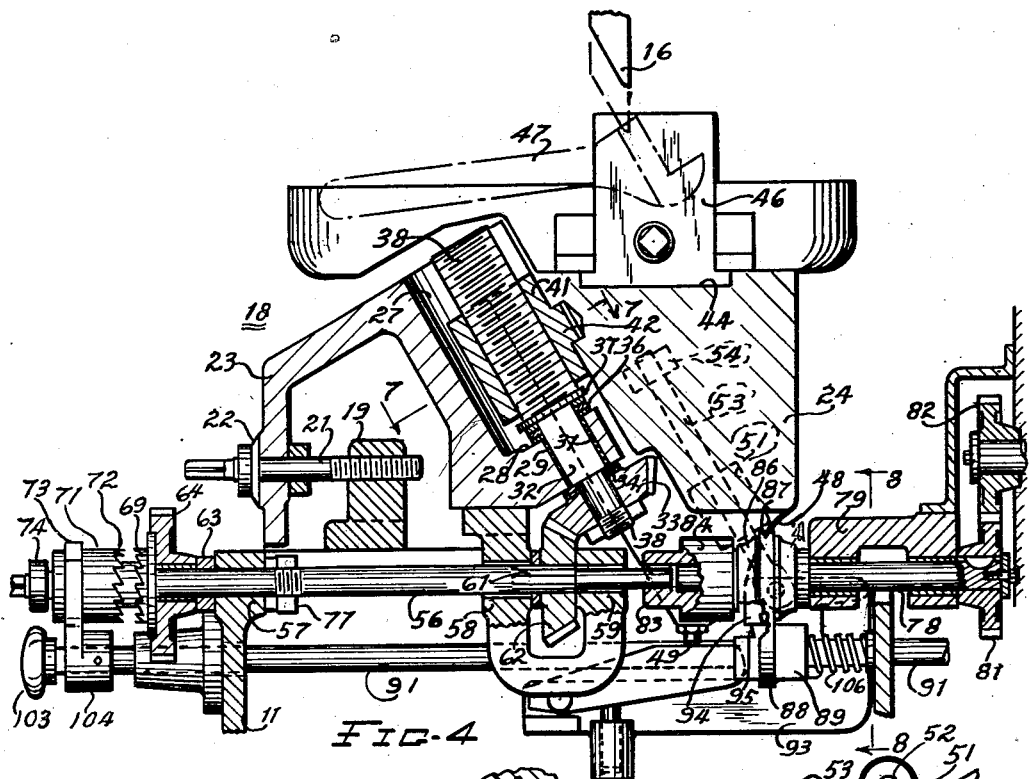
Fig-4
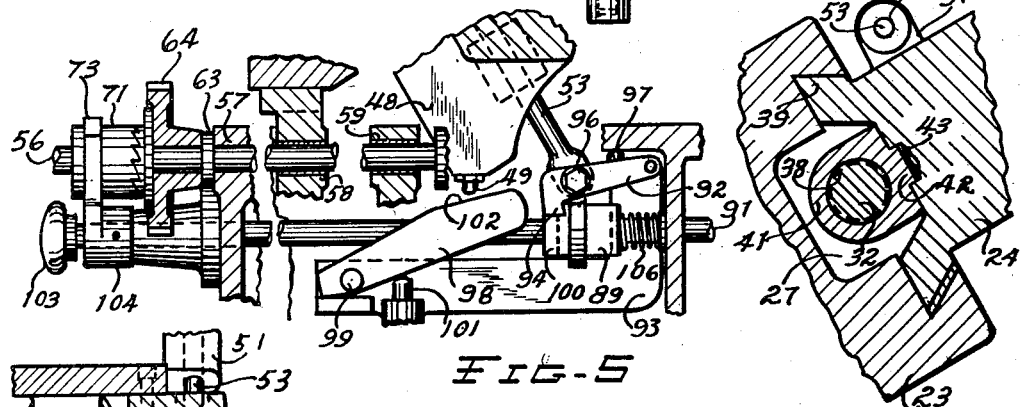
Fig-5
Fig-7
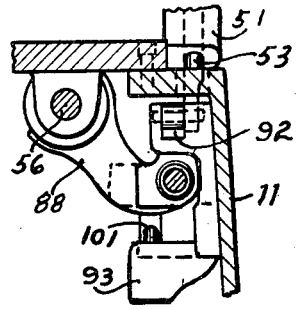
Fig-8
Inventor
Ernest H. Varmee
By Richmond Hayes
Attorney

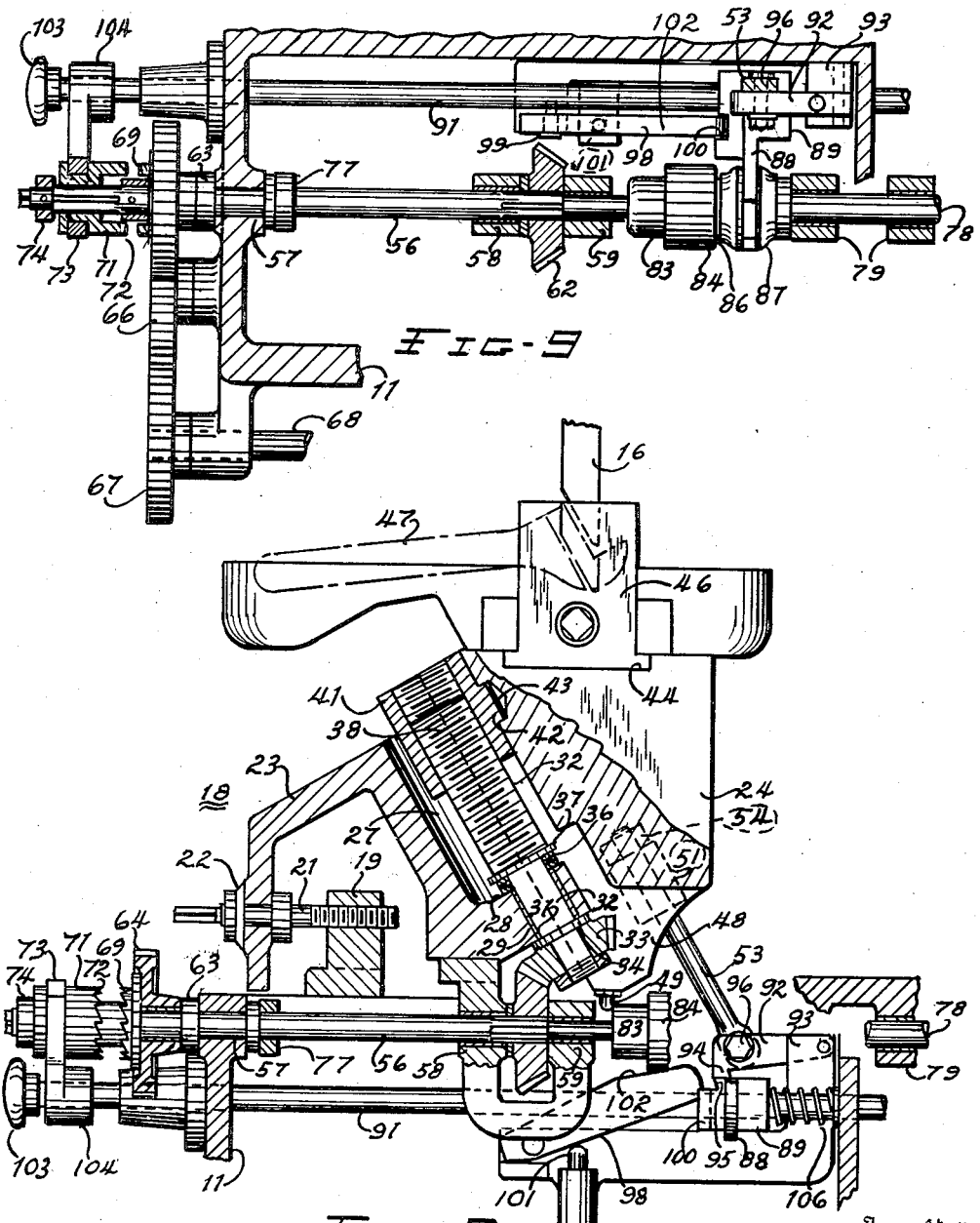

Patented Mar. 16, 1948

2,437,794

UNITED STATES PATENT OFFICE 2,437,794

METALWORKING MACHINE

Ernest H. Varmee, Jamestown, N. Y., assignor to Rane Tool Company, Inc., Jamestown, N. Y., a corporation of New York Application September 29, 1943, Serial No. 504,282

8 Claims. (Cl. 90—49)

This invention relates to improvements in metal working machines and more particularly to machines that are capable of performing slotting operations.

In its present form the invention discloses a fixture for mounting a work piece that is applicable to a conventional slotting machine or other type of metal working machine adaptable to the performance of slotting operations. This fixture not only mounts a work piece but includes mechanism for feeding such piece into and out of position for operation by a power actuated tool.

In machines of the nature to which the present invention applies, a slotting operation of considerable proportions may be intended to be performed and this necessitates the provision of rugged and accurate equipment. The fixture must not only be capable of securely holding each work piece in an exact and predetermined location with respect to a power tool, but must also be capable of movement by which to feed the work piece to the tool in such a manner that, in production operations, all work pieces will be so accurately slotted as to be within any specified tolerances. Furthermore, a feed mechanism for a fixture of this nature must be capable of presenting each work piece to a slotting or other cutting tool in a speed or in a manner consistent with the size of slot to be cut, type of cutting tool used, and nature of the material from which the work piece is formed.

It is a purpose and object of the present invention to provide a fixture for a work piece that may be readily adapted to, and utilized on, any of several types of metal working machines.

It is also an object of the invention to provide a fixture of such ruggedness that it may be used to mount and properly secure a work piece for operation by a slotting tool.

Another object of the invention is to provide a fixture that includes a mechanism for presenting a work piece to a slotting tool by either a continuous or intermittent feed.

It is also an object of the invention to provide a fixture that is so adjustable as to facilitate slotting operations of various sizes and depths and at desired angles.

A further and extremely important object of the invention is in the provision of a feed mechanism for a fixture that advances a work piece toward the slotting tool at any desired rate and quickly withdraws the piece preparatory to a repeated operation by the tool.

A still further object and advantage of the present structure resides in the provision of a fixture of such nature as to enable an operator to quickly and easily mount and remove a work piece with assurance that successive operations on the same piece or on successive pieces will be within required tolerances.

Other objects and advantages of the invention may be more fully understood from a consideration of the following specification taken in conjunction with the accompanying drawings; and in which Fig. 1 is a fragmentary side elevational view of a metal working machine in which is embodied one form of the invention;

Fig. 4 is a vertical sectional view taken substantially on the line 4—4 of Fig. 3 and shows the parts in neutral or inoperative position;

Fig. 5 is a fragmentary view of the structure of Fig. 4 and shows the position of the parts of the mechanism at the start of a cutting or slotting operation;

Fig. 6 is a view similar to Fig. 4 and shows the position of the parts on completion of an operation and as the fixture is about to rapidly return to inoperative position;

Fig. 7 is an enlarged fragmentary transverse sectional view of the work piece feed, being taken substantially on the line 7—7 of Fig. 4;

Fig. 8 is a fragmentary vertical sectional view taken substantially on the line 8—8 of Fig. 4; and Fig. 9 is a fragmentary horizontal sectional view showing the relationship of clutches, drive and clutch actuator.

Figure 2:
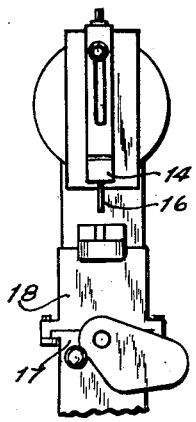
Fig. 2 is a fragmentary front elevational view of the machine and invention shown in Fig. 1.
Figure 1:
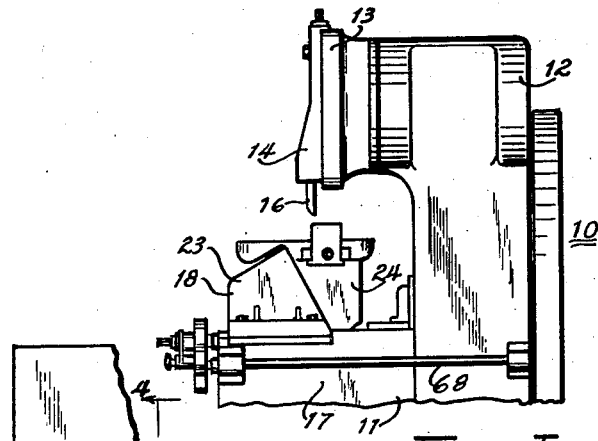

Referring to the drawing, the reference numeral 10 is employed to generally designate a metal working machine to which the present form of the invention is applicable. This machine is generally intended for slotting or similar operations and includes a base 11 in which may be located the driving means for the slotting tool and fixture feed mechanism. The head 12, as is conventional in machines of this type, mounts a swivel 13 which in turn supports a tool holder 14 in which is secured a slotting tool 16. Suitable drive connection to give a vertical stroke to the tool 16 is provided through the head 12 from the drive means in the base 11.

The base 11 includes a bed 17 on which is mounted a fixture 18. This fixture is provided with means for obtaining adjustment relative to the bed through a block 19 and screw 21. The block and engaged portion of the screw may, as shown, be within a hollow portion of the fixture, the screw extending beyond the fixture and being fitted with a dial 22 by which to accurately determine the position of the fixture with respect to the bed.

The fixture 18 comprises a part 23 that is fixed, except for the adjustment already mentioned, and a movable part 24 that mounts a work piece. Part 23 of the fixture 18 includes an inclined guideway 26 and recessed area 27. The recessed area and guideway extend from the top of this part of the fixture downwardly to a shoulder 28. An opening 29 is made through this shoulder and, when fitted with a suitable bushing 31, mounts a shaft 32. This shaft, beneath shoulder 28, is fitted with a beveled gear 33, suitable bearing washers 34 being interposed between the lower surface of the shoulder 28 and gear 33. Above the shoulder 28 are a series of three washers 36, the lowermost washer being pinned or otherwise suitably secured against rotation to the shoulder 28, and the topmost washer being secured to an annular shoulder 37 of the shaft 32. The intermediate washer 36 is freely rotatable and, with the other washers, provides a suitable thrust bearing for the shaft 32. From the shoulder 37 to its end, the shaft 32 is formed with screw threads 38.

The part 24 of the fixture 18 includes portions 39 that project into the guides 26 of the part 23. Between the portions 39 is located a sleeve 41 that is internally threaded to receive the screw threads 38 of the shaft 32. The sleeve 41 is shown to be removable from the part 24, not only to provide for replacement should undue wear occur, but also in the event it is desired to alter, at this point, the rate of feed by which the shaft 32 affects movement of the part 24 of the fixture. To this end, the sleeve 41 is shown with a boss 42 that is fitted into a recess 43 of the part 24. Additionally, the sleeve 41 may be of increased or decreased length, depending on the necessary travel of the part 24 and the particular operation to be performed.

In the upper surface of the part 24 of the fixture is a track 44 into which is fitted a work piece holder 46. The details of this holder are not set forth inasmuch as they form no specific part of the invention and will be modified to mount different sizes and kinds of work pieces. In the present instance, the holder is designed to mount the handle and fixed jaw portion of an adjustable end wrench 47. At this point in the manufacture of the wrench, the slot for mounting the adjustable jaw is to be formed. In Fig. 4 of the drawing the cutting or slotting tool 16 is shown in full and dotted line positions of operation with respect to the wrench 47.

Two wing-like extensions 48 extend beneath the body of the fixture part 24 and serve to create a finished appearance to the opposite sides of this part, as well as provide a recessed area by which to permit movement into one extreme position (see Fig. 4). Additionally, one of these extensions is fitted on its lowermost edge with an adjustable pin 49. On the same extension as pin 49, a laterally extending boss 51 is provided. An opening 52, through this boss, receives a shaft 53. This shaft is parallel to the axis of rotation of shaft 32 and, when projected through the boss 51, is fitted at its upper end with an adjustable stop 54.

Mounted in the base 11 is a horizontally disposed drive shaft 56 that near one end is supported in a bearing 57 of the base, and near the other end is supported by spaced apart bearings 58 and 59. The shaft is fitted with a key 61 by which to mount a beveled gear 62 between bearings 58 and 59, this gear being in mesh with gear 33 carried by the shaft 32. Beyond the bearing 57 the shaft is fitted with a collar 63. Adjacent this collar is a gear 64 that, through further gears 66 and 67, connects with a power driven shaft 68. However, gear 64, although not axially movable, is freely rotatable about shaft 56 and is formed with clutch teeth 69. A clutch member 71, keyed to the shaft 56, is provided with complementary teeth 72, and this member is adapted, by yoke 73, to move axially of the shaft 56 to engage the teeth 69 and 72 and transmit the drive of gear 64 to the shaft. Beyond the member 71 is a locking collar 74 and squared end to the shaft 56. To prevent axial movement of shaft 56 during the period when the clutch member 71 is moved into and out of engagement with gear 64, the collar 63 is preferably shrunk on the shaft, and on the opposite side of the bearing 57 there is applied a further collar or split nut 77.

In axial alignment with the shaft 56 is a further shaft 78. This shaft is supported by a bearing structure 79, and at one end is fitted with a gear 81 that, through gear structure 82, is connected with the drive mechanism of the machine. The other end of shaft 78 is in close proximity with an end of shaft 56, these proximate ends being enclosed by a collar 83 that is keyed to shaft 56, and includes an enlarged portion 84 enclosing an end of shaft 78. Projecting into the enlarged portion is a clutch member 86. This member is keyed to shaft 78 and includes a yoke 87 having an extension 88 attached to or made integral with a block 89 mounted on and secured to a push-rod 91.

One end of a dog 92 is pivotally mounted on a portion 43 of the base 11. The free end of this dog is formed with a tooth 94 that is adapted to engage a ledge 95 in the block 89. As may be seen in Figures 3 and 5 of the drawing, the lower end of shaft 53 is pivotally joined, as at 96, to the dog 92. Thus, movement of the dog 92, out of engagement with block 89, is controlled by movement of shaft 53, as will hereinafter be more fully described. However, a spring pin 97 urges the dog 92 into engagement with this block.

A trip arm 98 is mounted at one end by a pivot 99. This arm is yieldingly urged into the position of Fig. 5 by a spring pin 101. An upper flattened area 102 of this arm is, under certain circumstances of operation of the machine, adapted to be contacted by the pin 49 to move the arm downwardly against tension of the spring pin 101. This arm, when in the position shown in Fig. 4, lies within a slotted area 100 of the block 89.

Figure 3:
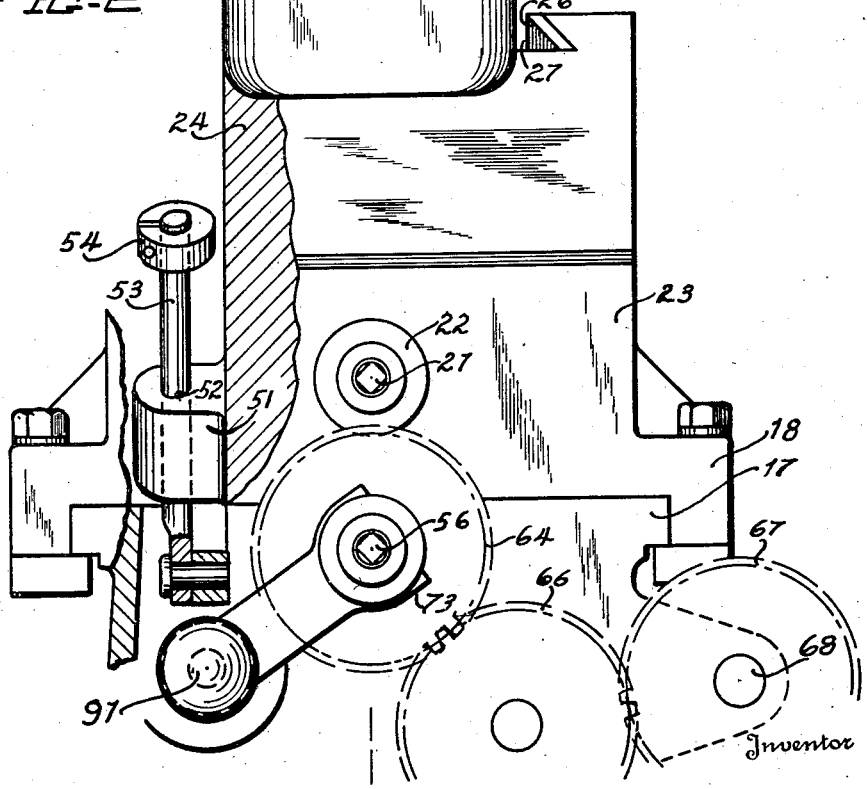
Fig. 3 is an enlarged front elevational view of the fixture showing the feed and stop mechanism, parts being broken away to more clearly illustrate certain of the details.

The push-rod 91 is parallel to the shaft 56, being somewhat beneath and to one side, as indicated in Fig. 3. This rod is mounted in suitable bearings in the base 11 and terminates in a knob 103. Adjacent the knob 103, an extension 104 of the yoke 73 is mounted on this rod, being secured thereto in any suitable manner. Thus axial movement of the rod 91 moves yoke 73 and with it the clutch member 71. Such movement of this rod also moves block 89 in a direction to compress spring 106, substantially as indicated by a comparison of Figures 4 and 5.

For a complete understanding of the invention, a single cycle of operation of the machine is set forth as follows: It is assumed that the holder 46 is of a type to receive and secure a wrench work piece 47. Also it is assumed that travel of the movable part 24 of the fixture 18 is sufficient for the cutting operation to be performed. If such travel of the part 24 is greater than necessary, it is controllable by adjustment of the stop 54 on shaft 53. Prior to the machine's being set in motion the parts are substantially as shown in Fig. 4 of the drawing. A separate control member (not shown) is provided for setting in motion the tool 16. In the present illustration of the invention, the feed mechanism, for moving the wrench part 47 into the path of the tool, is of the intermittent type and is synchronized through conventional structure with the reciprocating tool. The rod 91 may now be moved axially by application of pressure to knob 103. This movement of the rod causes yoke 73, that is connected to shaft 56, to mesh teeth 72 with teeth 69 of gear 64. At this point it will be observed that the tooth of the dog 92 remains in engagement with block 89 and that trip arm 98 remains in its lowermost position (that of Fig. 4) until pin 49 moves upwardly away from the surface 102 of the arm. Rotation of shaft 56 causes shaft 32 to rotate by means of the beveled gears 33 and 62. The threaded portion 38 of shaft 32 thus causes part 24 of the fixture to move upwardly in a plane defined by the guide structure of the fixture parts. The slotting operation takes place as the wrench part 47 continues its upward movement and tool 16 reciprocates.

At the point at which the slot in the wrench part 47 is completed, the movable part 24 of the fixture will have been raised to a position such that boss 51 contacts stop 54 and a slight further upward movement of part 24 raises shaft 53, thereby disengaging the dog 92 from block 89. It will be understood that during this part of the operation, block 89 has been held in the position of Fig. 4, and against tension of the spring 106, by this dog. Thus, when the block is released, spring 106 causes it to move the push-rod 91 in a direction to disengage teeth 72, 69, which stops upward feed of the part 24 of the fixture. Examination of Fig. 5 indicates that the block 89 is free to effect disengagement of the drive, since the trip arm 98 has previously moved into its uppermost position (see Fig. 6). Attention is also directed to the fact that the spring 106 has not merely moved the block 89 to return the push-rod 91 to the position of Fig. 4, but has moved this rod an added distance, as shown in Fig. 6, and by so doing, yoke 87 has been moved to effect engagement of the clutch member 86. Thus shaft 78, that is rotating at a relatively high speed, now drives shaft 56 in a reverse direction and, through gears 62, 33, shaft 32 is caused to rapidly rotate and return the part 24 of the fixture to its lowermost position. As the part 24 of the fixture approaches neutral or inoperative position, pin 49 contacts the raised trip arm 98, moving it downwardly from the position of Fig. 6 to that of Fig. 4, and against tension of the spring pin 101. As this arm moves downwardly, the free, rounded end thereof enters the slot 100 of the block 89, and by contact with the block, moves it in a direction to compress spring 106 and permit the tooth 94 of dog 92 to again engage the block and hold it in the position of Fig. 4. Movement of the block in this direction, to the right as viewed in the drawing, disengages the clutch member 86 and returns the upfeed clutch to the neutral position of Fig. 4. Thus, the parts are again in the initial inoperative position and the cutting or slotting operation may be repeated by again axially moving the push-rod 91.

It will be evident from the above description that the upfeed drive and rapid return drive are in continuous operation, being connected with the source of power of the machine at all times the machine is in use, and that once the upfeed is commenced, the machine will function to perform a given work, return the fixture to inoperative position and stop. It is of course clear that with other types of cutting operations and on a work piece other than the wrench shown, a more rapid or slower upfeed may be obtained by a change in gear ratio of gears 64, 66, and 67, and that the rapid return may in this manner also be altered. Furthermore, shaft 32 may be readily removed and replaced with a shaft having threads of a different pitch from the threads 38 shown, and sleeve 41 may be readily removed and replaced with another sleeve. Thus this structure lends itself to an easy and quick set-up for any given job and makes possible the ready replacement of worn or broken parts.

Although applicant has shown and described only one form of his invention as applied to a cutting or slotting operation of an adjustable jaw wrench, it will be understood that modifications of this structure, adapting it to cutting or slotting operations of other work pieces, are contemplated insofar as such modifications are within the spirit and scope of the annexed claims.

Having thus set forth my invention, what I claim as new and for which I desire protection by Letters Patent is:

1. In a machine having an overhead reciprocable cutting tool, a base, a work mounting fixture on said base, said fixture comprising relatively movable parts, one of said parts being secured to said base and the other of said parts including a work piece mounting, guide means associating said parts, a feed mechanism for said other part including means for moving a work piece into and out of the path of operation of said tool, a two directional drive for said mechanism, clutches for connecting said drive with a source of power, manually operable means for actuating one of said clutches and means associated with said drive for actuating the other of said clutches.

2. In a metal working machine, a fixture for mounting a work piece comprising relatively fixed and movable parts, guide means mounting the movable part on the fixed part, a screw feed for said movable part, clutch means operable to connect said feed with a source of power to move said movable part in one direction, further clutch means operable to connect said feed with the same source of power to move said movable part in the opposite direction and trip mechanism for successively disengaging said clutch means and engaging said further clutch means and disengaging said further clutch means.

3. In a machine having a base, a work mounting fixture on said base, said fixture comprising relatively fixed and movable parts, guide means mounting said movable part on said fixed part, a screw feed for said movable part, a drive shaft permanently associated with said feed, a manually operable clutch for connecting said drive shaft with a source of power to effect movement of said movable part in one direction, a further clutch operable to connect said drive shaft with a source of power to effect movement of said movable part in the opposite direction, and means operable, by predeterminable movement of said movable part in one direction, to disengage said manually operated clutch and engage said further clutch.

4. In a machine having a reciprocating cutting tool and a base, a fixture on said base having a part for supporting a work piece and being movable into and out of the path of operation of said tool, a screw feed associated with said part, a drive shaft having permanent gear connection with said screw feed, a clutch operable to connect said shaft with a source of power to move said part in the direction of the operating path of said tool, a further clutch operable to connect said shaft with a source of power to move said part in a direction away from the operating path of said tool, means providing for alternately connecting the clutches with the source of power, and further means operable by movement of said part in one direction to render an operating clutch inoperative.

5. In a machine having a base, a fixture on said base including relatively fixed and movable parts, guide means mounting said movable part on said fixed part, a feed mechanism operable to move said movable part into either of two positions, a drive shaft associated with said feed mechanism, a clutch engageable to connect said drive shaft with a source of power in a manner to move said movable part in one direction, a further clutch engageable to connect said drive shaft with a source of power in a manner to move said movable part in the opposite direction, an adjustable stop and trip mechanism operable, by predeterminable movement of said movable part into one position, to disengage said clutch and permit engagement of said further clutch, and a trip arm actuable, by movement of said movable part into another position, to disengage said further clutch.

6. In a machine having a reciprocating cutting tool and a base, a fixture on said base having a part for supporting a work piece, said part being guide mounted for movement into and out of the path of operation of said tool, a feed mechanism associated with and operable to move said part, a drive shaft having permanent connection with said feed mechanism, a clutch engageable to connect said drive shaft with a source of power in a manner to move the fixture part into the path of said tool, a further clutch engageable to connect a source of power with said drive shaft in a manner to move said fixture part out of the path of said tool, clutch control means, stop means operable, during movement of said fixture part into the path of said tool, to actuate said clutch control and effect disengagement of said clutch and engagement of said further clutch whereby to reverse the direction of movement of said fixture part, and trip means operable, during movement of said fixture part out of the path of said tool, to actuate said clutch control to disengage said further clutch.

7. In a machine, a work mounting fixture supported for movement into and out of an operative position, means for feeding said fixture into and out of said operative position, a clutch engageable to connect the feed means with a source of power in a manner to move said fixture into said operative position, a further clutch engageable to connect the feed means with a source of power in a manner to withdraw said fixture from said operative position, a control member for the clutches, said control member being so associated with the clutches as to be movable to engage only one clutch at a time, stop means associated with said fixture operable to move said control member to disengage said clutch and permit engagement of said further clutch, and trip means operable, by movement of said fixture, to move said control member and simultaneously disengage said clutch and said further clutch.

8. In a machine, a work mounting fixture supported for movement into and out of an operative position, means for feeding said fixture into and out of said operative position, a clutch engageable to connect the feed means with a source of power in a manner to move said fixture into said operative position, a further clutch engageable to connect the feed means with a source of power in a manner to withdraw said fixture from said operative position, means providing for alternately connecting said clutches with a source of power, and a mechanism including trip and stop means operable by movement of said fixture to consecutively disengage said clutch, engage said further clutch and disengage said further clutch.

ERNEST H. VARMEE.

REFERENCES CITED

The following references are of record in the file of this patent:

UNITED STATES PATENTS

| Number | Name | Date |
|--------|------|------|
| Re. 17,734 | Parsons | July 15, 1930 |
| 520,486 | Mason | May 29, 1894 |
| 554,422 | Holz | Feb. 11, 1896 |
| 718,514 | Parker | Jan. 13, 1903 |
| 742,356 | Roberts | Oct. 27, 1903 |
| 1,916,914 | Bennett | July 4, 1933 |
| 1,989,611 | Dall et al. | Jan. 29, 1935 |
| 2,004,441 | Kearney | June 10, 1935 |